United States Patent [19]
Reardon

[11] 3,821,056
[45] June 28, 1974

[54] METHOD OF BONDING HYDROXYL CONTAINING SUBSTRATES

[75] Inventor: Joseph Edward Reardon, Wilmington, Del.

[73] Assignee: E. I. du Pont de Nemours and Company, Wilmington, Del.

[22] Filed: Apr. 7, 1972

[21] Appl. No.: 242,228

[52] U.S. Cl. ...... 156/331, 117/122 H, 117/122 PA, 156/309, 156/314, 156/331, 156/332, 156/333, 156/337, 161/188, 161/190, 260/26, 260/40 TN, 260/75 NP, 260/77.5 AN
[51] Int. Cl. .............................................. C09j 5/02
[58] Field of Search............ 117/72, DIG. 7, 122 H, 117/122 PA; 156/331, 332, 337, 309, 314; 161/188, 190; 260/26, 28, 40 TN, 75 NP, 75 TN, 77.5 AN

[56] References Cited
UNITED STATES PATENTS

| | | | |
|---|---|---|---|
| 2,998,403 | 8/1961 | Muller et al. | 260/75 X |
| 3,188,302 | 6/1965 | Lorenz | 260/77.5 |
| 3,396,210 | 8/1968 | McKillip et al. | 260/859 |
| 3,615,801 | 10/1971 | Marklow et al. | 260/28 |
| 3,644,569 | 2/1972 | Pietsch et al. | 260/835 |
| 3,645,945 | 2/1972 | Lesesne et al. | 260/28 |
| 3,684,639 | 8/1972 | Keberle et al. | 161/87 |

*Primary Examiner*—Charles E. Van Horn
*Assistant Examiner*—Robert A. Dawson

[57] ABSTRACT

Method of bonding together two substrate surfaces each having a chemical composition containing free hydroxyl groups such as cellulose or fiber glass-reinforced polyester in which (1) each substrate surface is coated with a polyisocyanate such as the reaction product of toluene diisocyanate and trimethylol propane, (2) applying between and in contact with the coated surfaces a layer of thermoplastic adhesive composition comprising thermoplastic segmented copolyester elastomer, and (3) applying heat to the area of the bond.

10 Claims, No Drawings

METHOD OF BONDING HYDROXYL CONTAINING SUBSTRATES

BACKGROUND OF THE INVENTION

1. Field of the Invention

This invention relates to a method of bonding hydroxyl containing substrates together using a two step process.

2. Description of the Prior Art

In a copending application of George L. K. Hoh and Akira Tsukamoto, U.S. Pat. No. 151,477, filed June 9, 1971, now abandoned, a thermoplastic adhesive composition having superior bond strength is disclosed which comprises A. 1 to 99 percent by weight of thermoplastic segmented copolyester elastomer consisting essentially of a multiplicity of recurring short chain ester units and long chain ester units joined through ester linkages, said short chain ester units amounting to about 15 to 75 percent by weight of said copolyester and being of the formula

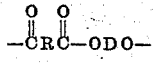

and said long chain ester units amounting to about 25 to 85 percent by weight of said copolyester and being of the formula

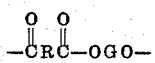

wherein R is the divalent aromatic radical remaining after removal of the carboxyl groups from aromatic dicarboxylic acid having a molecular weight of less than about 350, D is the divalent radical remaining after removal of the hydroxyl groups from organic diol having a molecular weight of less than about 250, and G is the divalent radical remaining after removal of the terminal hydroxyl groups from long chain glycol having an average molecular weight of about 350 to 6,000, said copolyester having a melt index of less than about 150 and a melting point of at least about 125° C., and B. 1 to 99 percent by weight of low molecular weight thermoplastic resin which forms compatible mixtures with the segmented copolyester, is thermally stable at 150° C., and has a melt viscosity of less than 10,000 centipoises at 200° C.

This adhesive composition is useful in a wide variety of applications as a hot melt adhesive. However, it would not be suitable for use in applications in which the adhesive must retain its strength at a temperature above about 100° C. This adhesive is also not satisfactory for use in applications in which it will come in contact with liquid hydrocarbons such as oil because of its compatibility with such materials.

SUMMARY OF THE INVENTION

A method has now been discovered for bonding together two substrate surfaces each having a chemical composition containing free hydroxyl groups so as to form a bond which will maintain its adhesive strength at temperatures above 100° C. or in contact with a liquid hydrocarbon. This method comprises (1) coating each substrate surface with a polyisocyanate reaction product having an isocyanato group functionality of at least 2 and being obtained by reacting an excess of a polyisocyanate with a polyol or a polyamine having an equivalent weight of 30–2,000, (2) applying between and in contact with the coated surfaces a layer of thermoplastic adhesive composition comprising thermoplastic segmented copolyester elastomer consisting essentially of a multiplicity of recurring short chain ester units and long chain ester units joined through ester linkages, said short chain ester units amounting to 15 to 65 percent by weight of said copolyester and being of the formula

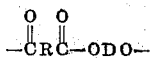

and said long chain ester units amounting to 35 to 85 percent by weight of said copolyester and being of the formula

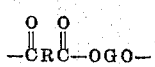

wherein R is the divalent radical remaining after removal of the carboxyl groups from dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6,000, said copolyester having a melt index of less than 150 and a melting point of at least 125° C., and (3) applying heat to the area of the bond.

DETAILED DESCRIPTION OF THE INVENTION

The method of this invention is a two-step process for adhering two hydroxyl-containing substrates together using a thermoplastic adhesive composition. By priming the surfaces of the substrates with a polyisocyanate reaction product, thermoset adhesive bond layers are formed which will withstand elevated temperatures well above 100° C. These thermoset adhesive bond layers also form a barrier which prevents the softening of the thermoplastic adhesive layer by penetration of hydrocarbons such as motor oil. The thermoplastic adhesive composition comprises segmented copolyester elastomer and may also contain one or more low molecular weight thermoplastic resin.

The thermoplastic segmented copolyester elastomer portion of the thermoplastic composition used in the process of this invention consists essentially of 15 to 65 percent recurring short chain ester units and 35 to 85 percent long chain ester units joined through ester linkages. The term "consisting essentially of," as used herein, is meant to include in the copolyester only those unspecified polymer units which do not materially affect the basic and essential characteristics of the copolyester for use in accordance with this invention. In other words, this term excludes unspecified polymeric units in amounts which prevent the advantages of its use in accordance with this invention from being realized. The term "short chain ester units," as applied to units in a polymer chain, refers to the reaction products of low molecular weight diols with dicarboxylic acids to form repeat units having molecular weights of less than about 550. These units are also referred to herein as "hard segments." The term "long chain ester units," as applied to units in a polymer chain, refers to the reaction products of long chain glycols with dicarboxylic acids. These units are also referred to herein as "soft segments."

The copolyesters used in accordance with this invention are prepared by polymerizing with each other (a) one or more dicarboxylic acids, (b) one or more linear long chain glycols, and (c) one or more low molecular weight diols. The term "dicarboxylic acid," as used herein, is intended to include the equivalents of dicarboxylic acids, that is, their esters or ester-forming derivatives such as acid chlorides and anhydrides, or other derivatives which behave substantially like dicarboxylic acids in a polymerization reaction with glycol.

The dicarboxylic acid monomers useful herein have a molecular weight of less than about 350. This molecular weight requirement pertains to the acid itself and not to its ester or ester-forming derivative. Thus, the ester of a dicarboxylic acid having a molecular weight greater than 350 is included in this invention provided the acid itself has a molecular weight below about 350.

The dicarboxylic acids used in the preparation of the segmented copolyester can be aromatic, aliphatic or cycloaliphatic. The dicarboxylic acids can contain any substituent groups or combination thereof which do not interfere with the polymerization reaction. Hydroxy acids such as p($\beta$-hydroxyethoxy) benzoic acid can also be used provided a dicarboxylic acid is also present.

Representative aromatic dicarboxylic acids include terephthalic acid, isophthalic acid, phthalic acid, bibenzoic acid, substituted dicarboxy compounds with benzene nuclei such as bis(p-carboxyphenyl) methane, p-oxy(p-carboxyphenyl) benzoic acid, ethylene-bis(p-oxybenzoic acid), ethylene-bis-(p-benzoic acid), tetramethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, indene dicarboxylic acid, and the like, as well as ring substituted derivatives thereof such as $C_1$–$C_{10}$ alkyl, halo, alkoxy or aryl derivatives. By the term "aromatic dicarboxylic acid" is meant a dicarboxylic acid in which each carboxyl group is attached to a carbon atom in an isolated or fused benzene ring or a ring which is itself fused to a benzene ring.

Representative aliphatic and cycloaliphatic dicarboxylic acids include sebacic acid, 1,3- (and 1,4-) cyclohexane dicarboxylic acids, adipic acid, glutaric acid, succinic acid, oxalic acid, itaconic acid, azelaic acid, diethylmalonic acid, maleic acid, fumaric acid, citraconic acid, allylmalonic acid, 4-cyclohexene-1,2-dicarboxylic acid, pimelic acid, suberic acid, 2,5-diethyl-adipic acid, 2-ethylsuberic acid, 2,2,3,3-tetramethylsuccinic acid, cyclopentanedicarboxylic acid, decahydro-1,5-(and 2,6-) naphthylene dicarboxylic acids, 4,4'-bicyclohexyl dicarboxylic acid, 4,4'-methylene-bis(cyclohexyl carboxylic acid), 3,4-furan dicarboxylic acid, and 1,1-cyclobutane dicarboxylic acid. The preferred aliphatic acids are the cyclohexanedicarboxylic acids and adipic acid.

The preferred dicarboxylic acids for preparation of the segmented copolyester are the aromatic acids of 8 to 16 carbon atoms, particularly phenylene dicarboxylic acids such as phthalic, terephthalic and isophthalic acids. The most preferred acids are terephthalic acid and mixtures of terephthalic and isophthalic acids.

The low molecular weight diols used in the preparation of the hard segments of the copolyesters have molecular weights of less than about 250. The term "low molecular weight diol," as used herein, should be construed to include equivalent ester-forming derivatives. In this case, however, the molecular weight requirement pertains to the diol only and not to its derivatives.

Suitable low molecular weight diols which react to form the short chain ester units of the copolyesters include acyclic, alicyclic and aromatic dihydroxy compounds. The preferred diols are those with 2 to 15 carbon atoms such as ethylene, propylene, tetramethylene, isobutylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, and the like. Especially preferred are the aliphatic diols of 2 to 8 carbon atoms. Suitable bisphenols include bis(p-hydroxy) diphenyl, bis(p-hydroxyphenyl) methane, bis(p-hydroxyphenyl) ethane, bis(p-hydroxyphenyl) propane and 2,2-bis(p-hydroxyphenyl) propane. Equivalent ester-forming derivatives of diols are also useful. For example, ethylene oxide or ethylene carbonate can be used in place of ethylene glycol.

The long chain glycols used to prepare the soft segments of these copolyesters have molecular weights of about 350 to 6,000, and preferably about 600 to 3,000. The chemical structure of the long chain polymeric part of the long chain glycol is not critical. Any substituent groups which do not interfere with the polymerization reaction to form the copolyester can be present. Thus, the chain can be a single divalent acyclic, alicyclic, or aromatic hydrocarbon group, poly(alkylene oxide) group, polyester group, a combination thereof, or the like. Any of these groups can contain substituents which do not interfere to any substantial extent with the polymerization to form the copolyester used in accordance with this invention. The hydroxy functional groups of the long chain glycols used to prepare the copolyesters should be terminal groups to the extent possible.

Suitable long chain glycols which can be used in preparing the soft segments of the copolymers include poly(alkylene ether) glycols in which the alkylene groups is of 2 to 9 carbon atoms such as poly(ethylene ether) glycols, poly(1,2- and 1,3-propylene ether) glycol, poly(1,2-butylene ether) glycol, poly(tetramethylene ether) glycol, poly(pentamethylene ether) glycol, poly(hexamethylene ether) glycol, poly(heptamethylene ether) glycol, poly(octamethylene ether) glycol, poly(nonamethylene ether) glycol, and random or block copolymers thereof, for example, glycols derived from ethylene oxide and 1,2-propylene oxide.

Glycol esters of poly(alkylene oxide) dicarboxylic acids can also be used as the long chain glycol. These glycols may be added to the polymerization reaction or may be formed in situ by the reaction of a dicarboxymethyl acid of poly (alkylene oxide) such as HOOCCH$_2$(OCH$_2$CH$_2$CH$_2$CH$_2$)$_x$OCH$_2$COOH with the low molecular weight diol, which is always present in a stoichiometric excess. The resulting poly(alkylene oxide) ester glycol then polymerizes to form G units having the structure

-DOOCCH$_2$(OCH$_2$CH$_2$CH$_2$CH$_2$)$_x$OCH$_2$COODin which each diol cap (D) may be the same or different depending on whether more than one diol is used. These dicarboxylic acids may also react in situ with the long chain glycol, in which case a material is obtained having a formula the same as above except that the D's are replaced with G's, the polymeric residue of the long chain glycol. The extent to which this reaction occurs is quite small, however, since the low molecular weight diol is present in considerable excess.

Polyester glycols can also be used as the long chain glycol. In using polyester glycols, care must generally be exercised to control the tendency to interchange during melt polymerization. Certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(-2,2-dimethyl-1,3-propylene/2,2-diethyl-1,3-propylene, 1,4-cyclohexanedicarboxylate) and poly(1,2-cyclohexylenedimethylene/2,2-dimethyl-1,3-propylene, 1,4-cyclohexanedicarboxylate) can be utilized under normal reaction conditions, and other more reactive polyester glycols can be used if proper reaction conditions, including a short residence time, are employed.

Suitable long chain glycols also include polyformals prepared by reacting formaldehyde with glycols such as pentamethylene glycol or mixtures of glycols such as a mixture of tetramethylene and pentamethylene glycols. Polythioether glycols also provide useful products. Polybutadiene and polyisoprene glycols, copolymers of these, and saturated hydrogenation products of these materials are also satisfactory long chain polymeric glycols. In addition, the glycol esters of dicarboxylic acids formed by oxidation of polyisobutylene-diene copolymers are useful raw materials. The preferred long chain glycols are poly(alkylene ether) glycols and glycol esters of poly(alkylene oxide) dicarboxylic acids.

The relative molecular weight of the segmented copolyester is expressed herein in terms of melt index, which is an empirical measurement of inverse melt viscosity. The segmented copolyester should have a melt index of less than about 150 in order to provide useful compositions. The melt indices specified herein are determined by the American Society for Testing and Materials (herein abbreviated "ASTM") test method D 1-238-65T using Condition L at 230° C. with a 2,160 gram load.

It is required that the segmented copolyester have a melting point of at least about 125° C. in order to provide useful thermoplastic compositions. This is achieved by at least about 10 percent by weight of the total low molecular weight diol and dicarboxylic acid being aromatic which provides the polyester with crystallizable short chain ester segments. Crystallinity in the short chain ester segments is increased by the use of more linear and symmetrical aromatic diacid. By "linear" aromatic diacid is meant a diacid in which each of the bonds between the carboxyl carbons and their adjacent carbons fall on a straight line drawn from one carboxyl carbon to the other. By "symmetrical" aromatic diacid is meant a diacid which is symmetrical with respect to a center line drawn from one carboxyl carbon to the other. For example, repeating ester units such as tetramethylene terephthalate give an especially high melting short chain ester segment. On the other hand, when a non-linear and unsymmetrical aromatic diacid, such as isophthalic acid, is added to crystallizable short chain ester segments, their melting point is depressed. Preferably the segmented copolyester has a melting point of at least about 140° C.

The melting points specified herein are determined by differential thermal analysis. The melting point is read from the position of the endotherm peak in a thermogram when the sample is heated from room temperature at the rate of 10° C./min. The details of this method are described in many publications, for example, by C. B. Murphy in *Differential Thermal Analysis*, R. C. Mackenzie, Editor, Volume I, Pages 643 to 671, Academic Press, New York, 1970.

The preferred segmented copolyester elastomers are those in which the dicarboxylic acid is aromatic dicarboxylic acid of 8 to 16 carbon atoms, the low molecular weight diol is aliphatic diol of 2 to 8 carbon atoms, the long chain glycol is poly(alkylene ether) glycol in which the alkylene group is of 2 to 9 carbon atoms, the short chain ester units amount to about 30 to 60 percent by weight of the copolyester, the long chain ester units amount to about 40 to 70 percent by weight of the copolyester, and the copolyester has a melt index of less than about 50 and a melting point of at least about 140° C. The copolyester elastomers prepared from terephthalic acid, or a mixture of terephthalic and isophthalic acids, 1,4-butanediol and polytetramethylene ether glycol having a molecular weight of about 600 to 3,000 are particularly preferred for use in this invention.

The copolyester elastomers used in accordance with this invention can be made by conventional condensation polymerization procedures, as for example, in bulk or in a solvent medium which dissolves one or more of the monomers. They are conveniently prepared by a conventional ester interchange reaction. A preferred procedure involves heating the dimethyl ester of terephthalic acid, or a mixture of terephthalic and isophthalic acids, with a long chain glycol and an excess of a short chain diol in the presence of a catalyst at 150° to 260° C., followed by distilling off the methanol formed by the interchange. Heating is continued until methanol evolution is complete. Depending on the temperature, catalyst and diol excess, this polymerization is complete within a few minutes to a few hours. This procedure results in the preparation of a low molecular weight prepolymer which can be converted to the high molecular weight segmented copolyester used in accordance with this invention.

These prepolymers can also be prepared by a number of alternate esterification or ester interchange processes. For example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate diacids, anhydrides or acid chlorides, for example, with diols or by other processes such as reaction of the diacids with cyclic ethers or carbonates. Obviously the prepolymer can also be prepared by carrying out these processes in the presence of the long chain glycol.

The resulting prepolymer is then converted to the high molecular weight segmented copolyester elastomer by distillation of the excess of short chain diol. Best results are usually obtained if this final distillation is carried out at less than 1 mm. pressure and 240°–260° C. for less than 2 hours in the presence of an antioxidant such as sym-di-beta-naphthyl-p-phenylenediamine or 1,3,5-trimethyl-2,4,6-tris [3,5-ditertiary-butyl-4-hydroxybenzyl] benzene.

Most practical polymerization techniques rely upon ester interchange to complete the polymerization reaction. In order to avoid excessive hold times at high temperatures with possible irreversible thermal degradation, it is advantageous to employ a catalyst for the ester interchange reaction. While a wide variety of catalysts can be used, organic titanates such as tetrabutyl titanate, used alone or in combination with magnesium or zinc acetates, are preferred. Complex titanates, such as $Mg[HTi(OR)_6]_2$, derived from alkali or alkaline earth metal alkoxides and titanate esters are also very effective. Inorganic titanates such as lanthanum titanate, calcium acetate/antimony trioxide mixtures and lithium and magnesium alkoxides are representative of other catalysts which can be used.

While these condensation polymerizations are generally run in the melt without added solvent, it is sometimes advantageous to run them in the presence of inert solvent in order to facilitate removal of volatile products at lower than usual temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers.

The processes described above can be run both by batch and continuous methods. The preferred method for continuous polymerization, namely, ester interchange with a prepolymer, is a well established commercial process.

In addition to the segmented copolyester, the thermoplastic adhesive compositions used herein may also contain one or more low molecular weight thermoplastic resins which form compatible mixtures with the segmented copolyester, are thermally stable at about 150° C., and have melt viscosities of less than about 10,000 centipoises at 200° C. The term "thermoplastic resin," as used throughout the specification and claims, is intended to include heat softenable resins, both natural and synthetic, as well as waxy types of materials. By the term "compatible" it is meant that there is no separation into distinct layers between the segmented copolyester and the low molecular weight resin or resins at the copolyester melt temperature. In some cases this compatibility is achieved in multi-component blends even though one of the low molecular weight thermoplastic resin components may not be compatible with the segmented copolyester elastomer alone. By the phrase "thermally stable," it is meant that there is no significant permanent alteration in the properties of the resin after heating at the specified temperature for one hour in the presence of air. The melt viscosities specified herein are measured with a Brookfield viscometer by ASTM test method D 1824–66 at elevated temperatures as indicated.

The low molecular weight thermoplastic resin may be added in an amount up to about 85 percent by weight based on the total thermoplastic segmented copolyester elastomer and low molecular weight thermoplastic resin. In other words, the thermoplastic adhesive composition should contain about 15 to 100 percent by weight of thermoplastic segmented copolyester elastomer and about 0 to 85 percent by weight of low molecular weight thermoplastic resin. Preferably the thermoplastic adhesive composition contains at least about 50 percent by weight of thermoplastic segmented copolyester elastomer.

Suitable low molecular weight thermoplastic resins include hydrocarbon resins, bituminous asphalts, coal tar pitches, rosins, phenolic resins, chlorinated aliphatic hydrocarbon waxes, chlorinated polynuclear aromatic hydrocarbons, and the like.

The term "hydrocarbon resins" refers to hydrocarbon polymers derived from coke-oven gas, coal-tar fractions, cracked and deeply cracked petroleum stocks, essentially pure hydrocarbon feeds, and turpentines. Typical hydrocarbon resins include coumarone-indene resins, petroleum resins, stryrene polymers, cyclopentadiene resins, and terpene resins. These resins are fully described in the Kirk-Othmer "Encyclopedia of Chemical Technology," Second Edition, 1966, Interscience Publishers, New York, Volume 11, Pages 242 to 255.

The term "coumarone-indene resins" refers to hydrocarbon resins obtained by polymerization of the resin formers recovered from coke-oven gas and in the distillation of coal tar and derivatives thereof such as phenol-modified coumarone-indene resins. These resins are fully described in the Kirk-Othmer Encyclopedia, supra, Volume 11, Pages 243 to 247.

The term "petroleum resins" refers to hydrocarbon resins obtained by the catalytic polymerization of deeply cracked petroleum stocks. These petroleum stocks generally contain mixtures of resin formers such as styrene, methyl styrene, vinyl toluene, indene, methyl indene, butadiene, isoprene, piperylene and pentylenes. These resins are fully described in the Kirk-Othmer Encyclopedia, supra, Volume 11, Pages 248 to 250. The so-called "polyalkylaromatic resins" fall into this classification.

The term "styrene polymers" refers to low molecular weight homopolymers of styrene as well as copolymers containing styrene and other comonomers such as alpha-methyl-styrene, vinyl toluene, butadiene, and the like when prepared from substantially pure monomer.

The term "cyclopentadiene resins" refers to cyclopentadiene homopolymers and copolymers derived from coal tar fractions or from cracked petroleum streams. These resins are produced by holding a cyclopentadiene-containing stock at elevated temperature for an extended period of time. The temperatures at which it is held determines whether the dimer, trimer, or higher polymer is obtained. These resins are fully described in the Kirk-Othmer Encyclopedia, supra, Volume 11, Pages 250 and 251.

The term "terpene resins" refers to polymers of terpenes which are hydrocarbons of the general formula $C_{10}H_{16}$ occurring in most essential oils and oleoresins of plants, and phenol-modified terpene resins. Suitable terpenes include alpha-pinene, beta-pinene, dipentene, limonene, myrcene, bornylene, camphene, and the like. These products occur as by-products of coking operations of petroleum refining and of paper manufacture. These resins are fully described in the Kirk-Othmer Encyclopedia, supra, Volume 11, Pages 252 to 254.

The term "bituminous asphalts" is intended to include both native asphalts and asphaltites such as Gilsonite, Glance pitch and Grahanite. A full description of bituminous asphalts can be found in Abraham's "Asphalts and Allied Substances," 6th Edition, Volume 1, Chapter 2, Van Nostrand Co., Inc., particularly Table III on Page 60.

The term "coal tar pitches" refers to the residues obtained by the partial evaporation or distillation of coal tar obtained by removal of gaseous components from bituminous coal. Such pitches include gas-works coal tar pitch, coke-oven coal tar pitch, blast-furnace coal tar pitch, producer-gas coal tar pitch, and the like. These pitches are fully described in Abraham's "Ashpalts and Allied Substances," supra, particularly Table III on Page 61.

The term "rosins" refers to the resinous materials that occur naturally in the oleoresin of pine trees, as well as derivatives thereof including rosin esters, modified rosins such as fractionated, hydrogenated, dehydrogenated and polymerized rosins, modified rosin esters, and the like. These materials are fully described in the Kirk-Othmer Encyclopedia, supra, Volume 17, Pages 475 to 505.

The term "phenolic resins" refers to the products resulting from the reaction of phenols with aldehydes. In addition to phenol itself, cresols, xylenols, p-tert.-butylphenol, p-phenylphenol and the like may be used as the phenol component. Formaldehyde is the most common aldehyde, but acetaldehyde, furfuraldehyde and the like may also be used. These resins are fully described in the Kirk-Othmer Encyclopedia, supra, Volume 15, Pages 176 to 207.

The term "chlorinated aliphatic hydrocarbon waxes" refers to those waxes which are commonly called "chlorinated waxes" such as chlorinated paraffin waxes. These waxes typically contain about 30–70 percent by weight of chlorine.

The term "chlorinated polynuclear aromatic hydrocarbons" refers to chlorinated aromatic hydrocarbons containing two or more aromatic rings such as chlorinated biphenyls, terphenyls, and the like, and mixtures thereof. These materials typically contain 30 to 70 percent by weight of chlorine.

Typically the thermoplastic compositions used herein contain more than one low molecular weight thermoplastic resin. For example, low molecular weight styrene polymers have been found to lower the melt viscosity of these compositions without substantially lowering the softening point. Since low melt viscosity contributes improved wetting by the composition of the coated surface of the substrate, which results in better adhesion, many useful compositions will contain some styrene polymer. Styrene polymers are also useful for increasing the compatibility of other resins with the segmented copolyester elastomer. Coumarone-indene resins of high softening point have been found to give strength to the compositions. Phenol-modified coumarone-indene resins have been found to have the effect of lowering the softening point of the compositions. In fact, the effect of phenol-modified coumarone-indene resins on the melting point is so great that the desired melting point is generally achieved by the addition of only a small amount of this resin. Any combination of these desired properties can be achieved by mixing two or more low molecular weight thermoplastic resins with the copolyester elastomer in a proper proportion.

The polyisocyanate reaction products which are used in the process of this invention are those materials commonly referred to as polyisocyanate adducts or prepolymers which have an isocyanato group functionality of at least about 2. The functionality can be determined from the percent available NCO groups and the average molecular weight of the polyisocyanate composition. The percent available NCO groups can be determined by the procedures of ASTM Test Method D1638. The functionality can also be readily estimated for many polyisocyanate reaction products from a knowledge of the amounts and identity of the components used in their preparation. These polyisocyanate reaction products are customarily obtained by reacting an excess of a polyisocyanate with one or more polyol or polyamine having an equivalent weight of about 30 to 2,000.

Aromatic, aliphatic and cycloaliphatic polyisocyanates can be used to prepare the polyisocyanate reaction products. The preferred polyisocyanates are the $C_8$–$C_{25}$ aromatics, $C_2$–$C_{18}$ aliphatics and $C_5$–$C_{25}$ cycloaliphatics. Representative aromatic polyisocyanates include 2,4-tolylene diisocyanate, 2,6-tolylene diisocyanate, 4,4'-methylene bis(phenyl isocyanate), 1,3-phenylene diisocyanate, triphenylmethane triisocyanate, 2,4,4'-triisocyanatodiphenyl ether, 2,4-bis(4-isocycnatobenayl)phenylisocyanate and related polyarol polyisocyanates, 1,5-naphthalene diisocyanate and mixtures thereof. Representative aliphatic polyisocyanates include hexamethylene diisocyanate, xylylene diisocyanate, 1,12-dodecane diisocyanate and lysine ethyl ester diisocyanate. Representative cycloaliphatic polyisocyanates include 4,4'-methylenebis(cyclohexyl isocyanate), 1,4-cyclohexylene diisocyanate, 1-methyl-2,4-cyclohexylene diisocyanate and 2,4-bis(4-isocyanatocyclohexylmethyl) cyclohexyl isocyanate. The polyisocyanates can be used in refined grades or as undistilled crude products containing varying amounts of phosgenation by-products.

The use of polyols is preferred to polyamines in preparing the polyisocyanate reaction product. Representative polyols include ethylene glycol, diethylene glycol, 1,3-butanediol, 1,4-butanediol, dipropylene glycol, trimethylol propane, glycerol, 1,2,6-hexanetriol, pentaerythritol, sorbitol; oxyethylated or oxypropylated derivatives of foregoing polyols having equivalent weights up to about 2,000 such as polyalkylene oxide glycols and triols; polyesters derived from the foregoing polyols and organic dicarboxylic acids such as adipic, sebacic, phthalic and terephthalic acids; polytetramethylene ether glycols; polycaprolactone glycols; oxyethylated and oxypropylated derivatives of nitrogen-containing compounds such as ethylene diamine, ethanol amine, diethanol amine and triethanol amine; and oxyethylated or oxypropylated derivatives of dihydric phenols such as hydroquinone, resorcinol or bisphenol A. Polyols having from 2 to 8 hydroxyl groups are preferred.

Representative polyamines for preparing the isocyanate reaction products include ethylene diamine, 1,2- propylene diamine, polyoxypropylene diamines, 1,3-phenylene diamine, 2,4-tolylene diamine, 4,4'-methylene dianiline, 4,4'-methylenebis(2-chloroaniline) and 4,4'-methylenebis (cyclohexyl amine).

Polyisocyanate/polyol reaction products derived from about 1.2 to 4.0, and particularly 1.5–2.2, equivalents of NCO groups per equivalent of OH groups are preferred for use in the present process over other reaction products. This preference is based on convenience in use and the effectiveness of bonding. An especially preferred class of polyisocyanate compositions for use in the present invention are the prepolymers described in U.S. Pat. No. 3,188,302. The reaction conditions described in this patent would be satisfactory for the polyisocyanate/polyol reaction.

The method of this invention is useful for bonding together two substrate surfaces each having a chemical composition containing free hydroxyl groups. Suitable substrates include cellulose such as in the form of paper, cardboard, etc., hydroxyl-containing polyesters, hydroxyl-containing alkyd resins, hydroxyl-containing polyurethane resins, and the like. The substrate may contain sizing, fillers, pigment, reinforcing fibers and the like provided they are not present in such large quantities that they interfere with the reaction between the hydroxyl groups of the substrate and the isocyanate groups of the polyisocyanate reaction product.

In accordance with the process of this invention a coating of the polyisocyanate reaction product is first applied to the surface of each substrate by a suitable technique such as painting, trowling, curtain coating, doctor blading, and the like. A layer of thermoplastic adhesive composition is then applied to at least one of the coated substrate surfaces by a suitable technique such as hot melt extrusion, trowling, and the like. The total composite of both substrates is then brought in contact.

The amount of heat needed to cause the thermosetting reaction of the hydroxyl groups and the isocyanate groups to take place will vary depending upon the particular reactants present and the length of time that heat is applied to the area of the bond. In general, temperatures varying from slightly elevated temperatures such as about 40° C. to temperatures up to about 350° C. may be used. Preferably, the reactants are chosen so that the thermosetting reaction will take place under the influence of the heat brought to the area of the bond by hot melt application of the thermoplastic adhesive composition. In this case heat is applied to the area of the bond concurrent with the step of applying the layer of thermoplastic adhesive composition between and in contact with the coated surfaces. Suitable techniques for hot melt application of adhesives are well-known to those skilled in the art.

One important use for the process of this invention is in preparing cardboard cans having a side lapped seam which can be used for packaging motor oil. If the thermoplastic adhesive composition were to be used without first priming the lapped seam area of the cardboard with a polyisocyanate reaction product, oil would penetrate through the cardboard and soften the adhesive thereby causing it to lose adhesion and resulting in bursting of the can. In accordance with the method of this invention, the oil does not penetrate the thermoset bond layer and no loss of adhesion is encountered. In preparing these cardboard cans, the thermoplastic adhesive composition is preferably applied by hot melt extrusion.

Another important use for the process of this invention is in connection with fiber glass-reinforced polyester laminates such as are used in auto body construction. In many cases it is necessary to adhere two glass-reinforced polyester laminate pieces together in construction or repair of these auto bodies. If a thermoplastic adhesive composition were to be used without first applying a layer of polyisocyanate reaction product to each surface the adhesive would flow and thereby lose adhesion at the high temperatures encountered during baking of the body paint. In accordance with this invention the bake cycle would, if anything, improve the thermoset character of the bond.

EXAMPLES OF THE INVENTION

The following examples, illustrating the novel method of bonding of this invention, are given without any intention that the invention be limited thereto. All parts and percentages are by weight except as otherwise noted.

EXAMPLE 1

A primer solution containing 30 percent of a reactive isocyanate compound derived from 5 moles of a standard commercial isomeric mixture of 2,4- and 2,6- toluene diisocyanate and 2 moles of trimethylol propane, 20 percent methyl isobutyl ketone and 50 percent methyl ethyl ketone was brushed onto a 1-inch wide, 6-inch long piece of resin impregnated compressed cellulose cardboard oil can stock. The primer was air dried for 5 minutes to remove the solvent. A segmented copolyester derived 35.4 percent from terephthalic acid, 13.4 percent from 1,4-butanediol and 51.2 percent from poly(tetramethylene ether) glycol having a molecular weight of about 1,000, containing 42.6 percent short chain ester units and having a melting point of 168° C. measured by differential thermal analysis and a melt index of 32 was heated to 180° C. and applied in the molten state to the primed board. A second piece of primed board was immediately applied in lap shear configuration with ½-inch overlap. A similar sample was prepared using unprimed board for comparison. The samples were aged in motor oil at 130° F. for 72 hours. The primed samples gave substrate failing bonds, whereas the unprimed samples fell apart.

EXAMPLE 2

Example 1 was repeated except that the thermoplastic adhesive composition contained 90 percent of the thermoplastic segmented copolyester elastomer described in Example 1, 5 percent of "LTP" 115, a phenol-modified terpene resin having a softening point of 115° C. and a melt viscosity of 224 centipoises at 190° C. sold by Pennsylvania Industrial Corp., and 5 percent of "Piccolastic" A25, a low molecular weight styrene homopolymer having a ring and ball softening point of about 25° C., sold by Pennsylvania Industrial Chemical Corp. The resulting data are given in the table.

EXAMPLE 3

Example 1 was repeated except that the thermoplastic adhesive composition contained 50 percent of the segmented copolyester elastomer described in Example 1, 25 percent of "LTP" 115 (Example 2), and 25 percent of "Piccolastic" A 25 (Example 2). The resulting data are given in the table.

EXAMPLE 4

Example 1 was repeated except that the thermoplastic adhesive composition contained 40 percent of the segmented copolyester elastomer described in Example 1, 30 percent of "LTP" 115 (Example 2), and 30 percent "Piccolastic" A 25 (Example 2). The resulting data are given in the table.

EXAMPLE 5

Example 1 was repeated except that the thermoplastic adhesive composition contained 30 percent of the segmented copolyester elastomer described in Example 1, 30 percent of "LTP" 115 (Example 2) and 40 percent of "Piccolastic" A 5, a low molecular weight styrene homopolymer having a ring and ball softening point of about 5° C. and a melt viscosity of 18 centipoises at 190° C. sold by Pennsylvania Industrial Chemical Corp. The resulting data are given in the table.

EXAMPLE 6

Example 1 was repeated except that the thermoplastic adhesive composition contained 50% of a segmented copolyester elastomer derived 31.6 percent from terephthalic acid, 9.2 percent from isophthalic acid, 16.6 percent from 1,4-butanediol, and 42.6 percent from poly(tetramethylene ether) glycol having a molecular weight of about 1,000, containing 52.6 percent short chain ester units, and having a melting point of 158° C. and a melt index of 15; 25 percent of "LTP" 115 (Example 2); and 25 percent of "Piccolastic" A 25 (Example 2). The resulting data are given in the table.

EXAMPLE 7

Example 1 was repeated except that the thermoplastic adhesive composition contained 40 percent of the segmented copolyester elastomer described in Example 6, 30 percent of "LTP" 115 (Example 2), and 30 percent of "Piccolastic" A 25 (Example 2). The resulting data are given in the table.

EXAMPLE 8

Example 1 was repeated except that the thermoplastic adhesive compositions contained 40 percent of a segmented copolyester elastomer derived 5.52 percent from phthalic acid, 36.83 percent from terephthalic acid, 0.07 percent from glycerol, 17.63 percent from 1,4-butanediol, and 39.94 percent from poly(tetramethylene ether) glycol having a molecular weight of about 980, and having an inherent viscosity of 1.41 deciliters per gram at a concentration of 0.1 gram per deciliter at 30° C. and a melt index of 3.64 at 220° C., and containing a small amount of symmetrical-di-beta-naphthyl-phenylene diamine as antioxidant, 30 percent of "LTP" 115 (Example 2), and 30 percent of "Piccolastic" A 25 (Example 2). The resulting data are given in the table.

TABLE

| Example | Brookfield Viscosity of Adhesive Composition at 190°C. | With or Without Priming | Lap Shear Strength after 72 hours in oil, psi |
|---|---|---|---|
| 1 | — | primed | substrate failing bond |
|   |   | unprimed | failed |
| 2 | — | primed | 128 |
|   |   | unprimed | failed |
| 3 | 9,160 | primed | substrate failing bond |
| 4 | 5,200 | primed | substrate failing bond |
| 5 | 2,360 | primed | 70 |
| 6 | 16,800 | primed | 170 |
| 7 | 9,200 | primed | 320 |
| 8 | 10,800 | primed | substrate failing bond |

EXAMPLE 9

A priming solution as described in Example 1 was brushed into a 1-inch wide, 6-inch long piece of low profile fiber glass-reinforced polyester sheet similar to that used to manufacture auto bodies. The primer was air dried for 5 minutes to remove the solvent. The segmented copolyester elastomer described in Example 6 was heated to 180° C. and applied in the molten state to the primed sheet. A second piece of primed sheet was immediately supplied in a lap sheer configuration with ½-inch overlap. A similar sample was prepared using an unprimed sheet for comparison. The primed fiber glass bond withstood a temperature of 150° C. for 1 hour without any measurable creep. The unprimed sample fell apart under similar testing conditions.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. A method of bonding together two substrate surfaces each having a chemical composition containing free hydroxyl groups which comprises
    1. coating each substrate surface with a polyisocyanate reaction product having an isocyanato group functionality of at least 2 and being obtained by reacting an excess of a polyisocyanate with a polyol or a polyamine having an equivalent weight of 30–2,000,
    2. applying between and in contact with the coated surfaces a layer of thermoplastic adhesive composition comprising thermoplastic segmented copolyester elastomer consisting essentially of a multiplicity of recurring short chain ester units and long chain ester units joined through ester linkages, said short chain ester units amounting to 15 to 65 percent by weight of said copolyester and being of the formula

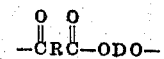

and said long chain ester units amounting to 35 to 85 percent by weight of said copolyester and being of the formula

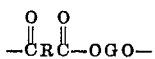

wherein R is the divalent radical remaining after removal of the carboxyl groups from dicarboxylic acid having a molecular weight of less than 350, D is the divalent radical remaining after removal of the hydroxyl groups from an organic diol having a molecular weight of less than 250, and G is the divalent radical remaining after removal of the terminal hydroxyl groups from long chain glycol having an average molecular weight of 350 to 6,000, said copolyester having a melt index of less than 150 and a melting point of at least 125° C., and 3. applying heat to the area of the bond to cause a thermosetting reaction between the hydroxyl groups of the substrate surfaces and the isocyanate groups of the polyisocyanate reaction product.

2. The method of claim 1 in which the substrate surfaces are cellulose.

3. The method of claim 2 in which the thermoplastic adhesive composition also contains up to 85 percent by weight of low molecular weight thermoplastic resin which forms compatible mixtures with the segmented copolyester, is thermally stable at 150° C., and has a melt viscosity of less than 10,000 centipoises at 200° C., based on the total thermoplastic segmented copolyester elastomer and low molecular weight thermoplastic resin.

4. The method of claim 3 in which the low molecular weight thermoplastic resin is selected from the group consisting of hydrocarbon resins, bituminous asphalts, coal tar pitches, rosins, phenolic resins, chlorinated aliphatic hydrocarbon waxes, and chlorinated polynuclear aromatic hydrocarbons.

5. The method claim 4 in which the dicarboxylic acid is aromatic dicarboxylic acid of 8 to 16 carbon atoms, the low molecular weight diol is aliphatic diol of 2 to 8 carbon atoms, and the long chain glycol is poly(alkylene ether) glycol in which the alkylene group is of 2 to 9 carbon atoms.

6. The method of claim 1 in which the substrate surfaces are fiber glass-reinforced polyester.

7. The method of claim 6 in which the thermoplastic adhesive composition also contains up to 85 percent by weight of low molecular weight thermoplastic resin which forms compatible mixtures with the segmented copolyester, is thermally stable at 150° C., and has a melt viscosity of less than 10,000 centipoises at 200° C., based on the total thermoplastic segmented copolyester elastomer and low molecular weight thermoplastic resin.

8. The method of claim 7 in which the low molecular weight thermoplastic resin is selected from the group consisting of hydrocarbon resins, bituminous asphalts, coal tar pitches, rosins, phenolic resins, chlorinated aliphatic hydrocarbon waxes, and chlorinated polynuclear aromatic hydrocarbons.

9. The method of claim 8 in which the dicarboxylic acid is aromatic dicarboxylic acid of 8 to 16 carbon atoms, the low molecular weight diol is aliphatic diol of 2 to 8 carbon atoms, and the long chain glycol is poly(alkylene ether) glycol in which the alkylene group is of 2 to 9 carbon atoms.

10. The method of claim 9 in which the polyisocyanate reaction product is derived from toluene diisocyanate and trimethylol propane.

* * * * *